May 30, 1933.     E. C. LUNDT ET AL     1,912,288
HEATING POT
Filed Oct. 26, 1932     2 Sheets-Sheet 1
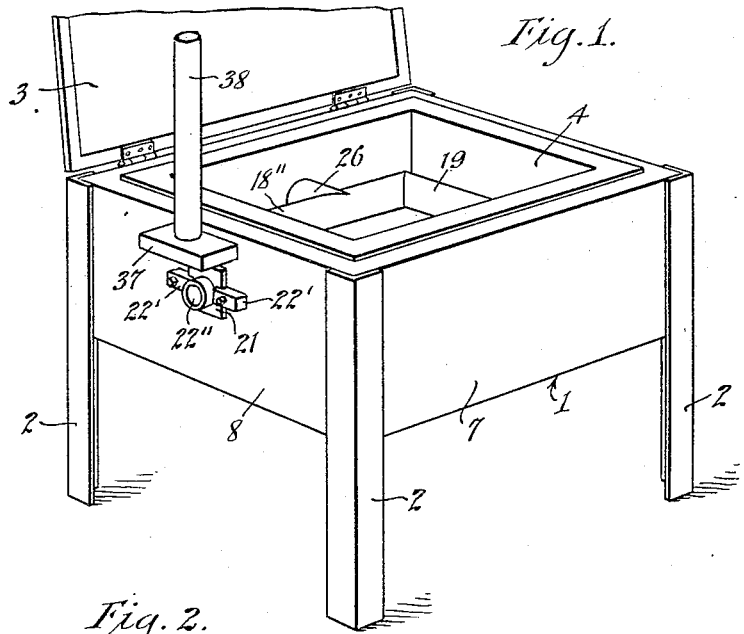
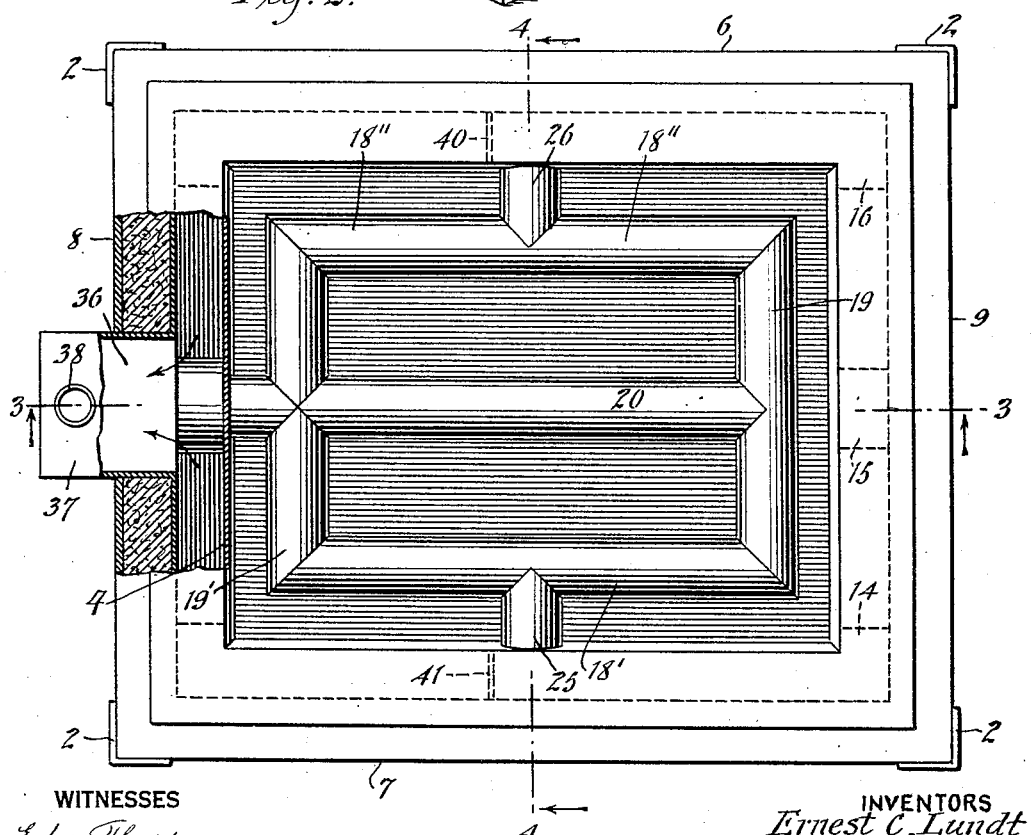
INVENTORS
Ernest C. Lundt
Norbert E. Bertl May 30, 1933.  E. C. LUNDT ET AL  1,912,288
HEATING POT
Filed Oct. 26, 1932  2 Sheets-Sheet 2
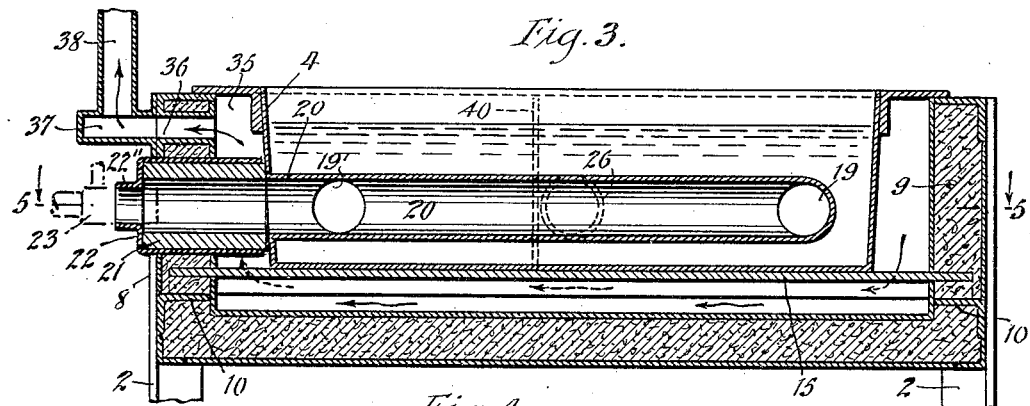
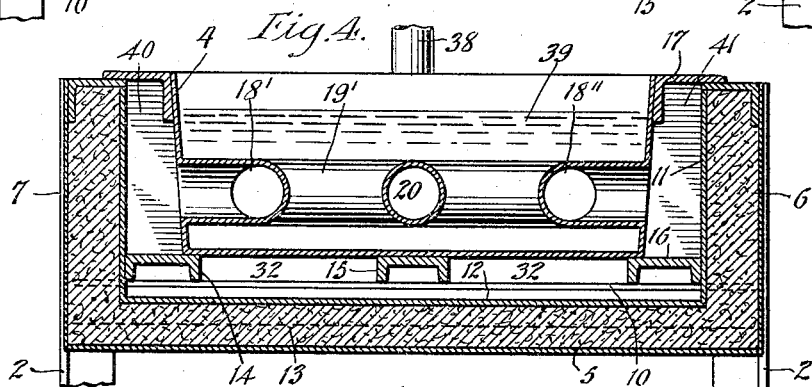
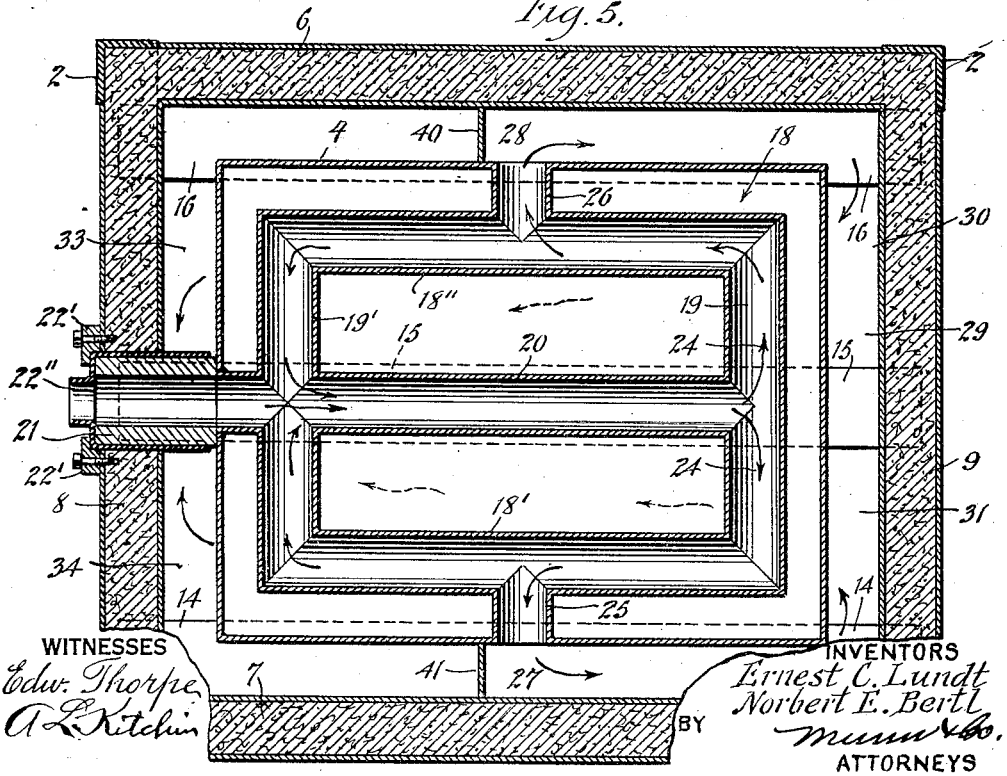
WITNESSES
Edw. Thorpe
A. L. Kitchin
INVENTORS
Ernest C. Lundt
Norbert E. Bertl
BY Munn & Co.
ATTORNEYS Patented May 30, 1933

1,912,288

UNITED STATES PATENT OFFICE

ERNEST C. LUNDT, OF BLOOMFIELD, AND NORBERT E. BERTL, OF BELLEVILLE, NEW JERSEY, ASSIGNORS TO THE CONSOLIDATED GAS COMPANY OF NEW YORK, A CORPORATION OF NEW YORK

HEATING POT

Application filed October 26, 1932. Serial No. 639,718.

This invention relates to improved heating pots of the kind commonly known as immersion heating pots, the object being to provide an improved construction wherein the fuel used is gas and wherein an even heating action is secured throughout the pot.

Another object of the invention is to provide an immersion heating pot wherein a system of immersion tubes is arranged to be submerged in the material being heated, the parts being so formed that the hot gases and products of combustion from the immersion tubes are distributed around the outside of the container to prevent chilling and to maintain the walls of the container at a substantially even temperature.

A further object of the invention is to provide a heating pot for heating different materials or for melting comparatively soft metals, the arrangement being such that the heating element consists of immersion tubes in connection with other parts whereby the heating gas and products of combustion will pass around all sides of the metal container, including the bottom.

In the accompanying drawings—

Figure 1 is a perspective view of a heating pot disclosing an embodiment of the invention, part of the lid being broken away;

Figure 2 is a top plan view on a large scale of the heating pot shown in Figure 1, the lid being removed and certain parts being shown in section;

Figure 3 is a sectional view through Figure 2 on the line 3—3;

Figure 4 is a sectional view through Figure 2 on the line 4—4;

Figure 5 is a horizontal sectional view through Figure 3 on the line 5—5.

Referring to the accompanying drawings by numerals, 1 indicates the body of the pot which may be supplied with suitable legs 2, and also provided with a cover or lid 3 which is hinged to the body 1. When the device is not in actual use the lid 3 is lowered to cover the receptacle or container 4 which is adapted to receive the material to be heated.

The container 4 may be of any desired shape, as, for instance, rectangular as shown in the drawings. The container 4 may be cast iron or low grade steel or other material, and is supported in the body 1 without contacting with the walls thereof, as illustrated in Figures 3 and 4. The body 1 is provided with a bottom 5, and walls 6 and 7 and side walls 8 and 9. A pair of bars 10 are carried by the legs 2, said bars being embedded in the walls 8 and 9, which walls, with the walls 6 and 7, are provided with an inner lining 11 which merges into the bottom covering 12. The respective walls and bottom are also provided with sheet metal exterior members and between the exterior members and the members 11 and 12 is arranged a heat insulating material 13 which may be asbestos, fire brick or other heat resisting material.

The bars 10 are arranged slightly above the bottom plate 12, as shown in Figure 4, and on these bars are arranged channel irons or other supporting bars 14, 15 and 16. On channel irons 14 to 16, inclusive, the container 4 is mounted. From this it will be seen that the container 4 is supported out of contact with the various walls of the body 1 and is held in a central position by suitable angle irons 17 which are welded or otherwise rigidly secured to the respective walls.

Arranged interiorly of the container or receptacle 4 is a group of immersion tubes 18 which are formed from metal as, for instance, low grade steel or iron, said tubes being spaced from the bottom of the container or receptacle 4 and also appreciably from the top.

These tubes are preferably welded to the container 4 at the various points of contact therewith. As shown in Figures 2 and 3, the immersion tubes are arranged in a rectangular group and each tube is round in cross section. As illustrated in Figure 3, the group or immersion tube unit 18 is provided with a tube 20 which extends to the wall of the container 4 where it is welded to the container and discharges through said wall into a refractory sleeve or tunnel 21. This tunnel or sleeve is supported and held against the container 4 by a suitable metal casing 22 clamped in place by suitable clamps 22'. The metal casing 22 is provided with a reduced tubular extension 22" which extension is adapted to carry the burner 23 which may be connected therewith by set screws or other means. It will be noted in Figure 3 that the burner 23 extends into the tunnel 21 and combustion takes place in said tunnel outside of the heat absorbing surfaces of the immersion tubes, thereby preventing the flame from impinging directly on the immersion tubes.

It will be evident that any suitable burner 23 may be used, the burner being completely independent of the immersion tubes and other associated parts, but arranged to project the hot gases or products of combustion directly from the tunnel 21 into the tube 20, whereby the gases and hot products of combustion will readily pass through tube 20 and thence follow the arrow, as illustrated particularly in Figure 5. This heated gaseous matter will pass in a reverse direction through side tubes 18' and 18'' to the end tube 19' and will then join the incoming gases to again pass through tube 20.

This action continues until some appreciable pressure is created in the various tubes of the system 18, and when this takes place the hot gases and products of combustion will pass out through flues 25 and 26 into the respective chambers 27 and 28. As indicated by the arrows in Figure 5, the matter passing through flues 25 and 26 will pass to the right, as shown in Figure 5, and then into the space or chamber 29, from which it passes downwardly through openings 30 and 31. The gas passing downwardly through openings 30 and 31 will pass into the bottom chamber 32 (Figure 4) and along the bottom chamber to the openings 33 and 34. From these openings it will pass into chamber 35 and thence out passageway 36 to the header 37, from whence it is discharged through pipe 38 (Figure 3). By having the heating matter pass in a circuit as just described, the heating immersion tubes 18 are first heated and as the pressure therein increases the heated gases and products of combustion will eventually pass around and over the outside surface of the container 4 so as to maintain the same heat more or less evenly and thereby prevent any chilling action to the molten metal 39. As the immersion tube unit 18 is spaced above the bottom of the receptacle 4 (Figure 4), the same will be immersed in the molten metal 39, thereby heat may be quickly and without loss transmitted to the metal being melted or which is being held melted, while the molten metal is being used from time to time.

It will, of course, be understood that the burner may be regulated so that the desired heat up to the maximum heating action of the burner may be secured. As an example, the full force of the burner is turned on first when the metal is cold and the other parts are cold. After the metal has been brought to a molten stage the heat is maintained if additional cold metal is added subsequently, but if only comparatively small quantities are used from time to time the heat may be turned down so as to merely maintain the molten metal in its molten condition and so that it will be ready for use when desired. Preferably the burner 23 is any of the usual type of burners now in use for purposes of this kind, and the gas, if desired, may be of the usual pressure although there would be no objection to providing gas under a higher pressure than the air mixed therewith. It is also necessary that it be brought in under some appreciable pressure to secure proper combustion and provide sufficient heat units. As the heat is never sufficiently great to melt low grade steel, preferably low grade steel is used in the immersion tube unit 18, in container 4 and in the other parts, as this presents a strong structure.

From Figure 5 it will be noted that baffles 40 and 41 are provided so that when the burner is started the hot gases and products of combustion will flow in the direction of the various arrows, so that no part will be heated appreciably more than any other part and, consequently, the entire supply of metal 39 may be maintained molten by the minimum use of gas.

It is to be understood that air is forced in along with the gas and this air is sufficient in quantity to maintain combustion in the tunnel or combustion chamber 21. It will also be noted that the bottom chamber 32 may act as a well for drip from the container 4, should it leak.

The flues 25 and 26 extend through the sides of the container 4 an appreciable distance below the top of the container, thus giving an unobstructed access to the molten metal during operation.

What we claim is—

1. A heating pot comprising a body having inner and outer metal sheetings, a heat resisting filling arranged between said sheetings, a container adapted to receive the material to be heated, means for so supporting the container in said body but spaced from the body at all points that there is a space between the body and the container, and an immersion tube unit secured to said container and provided with flues disposed for internal reception of a flame and for discharging into said space.

2. A heating pot including a container for the reception of a material to be heated, an immersion pipe unit arranged within said container and spaced from the bottom and also from the top thereof, said unit having a plurality of outlet flues discharging through the walls of the container, a gas burner for providing heat for said immersion tube unit, and means forming a surrounding wall spaced from said container, said means directing the gases and products of combustion from said unit over the outer surfaces of said container and to a discharge point.

3. A heating pot comprising a container, an immersion tube unit, arranged within the container, formed with an inlet and a plurality of outlet flues, said outlet flues being connected with the container and discharging through the walls of the container, and a gas burner providing a flame and hot products of combustion, said burner being arranged within said inlet and discharging the heat into and through said immersion tube unit.

4. A heating pot including a container for the reception of metal to be melted, and an immersion tube unit arranged within the container and provided with an inlet for cooperation with a burner extending through one wall of the container, a plurality of outlet flues extending through other walls of the container, said unit including a central tubular member arranged in alignment with the inlet, a pair of end tubular members merging into the central tubular member, and a pair of side members merging into the ends of the end members and carrying said outlet flues, said immersion tube unit being so spaced above the bottom of the container that it is submerged in the molten metal.

5. A heating pot including a body formed with a bottom and side walls, a plurality of channel irons extending across the bottom portion of the body but spaced from the bottom, a container resting on said channel irons, said container being of a width and length to be arranged within the body but spaced from the walls thereof at all points, a pair of baffles connecting the body at the sides to the side walls of said body, means forming an outlet for the space around said container, and a gas heated unit formed of a plurality of tubes connected together and provided with a pair of discharge flues arranged adjacent the respective baffles, whereby hot gaseous products of combustion may pass out of said gas heated unit into the space surrounding said container and finally upwardly at an end of the container to a point in communication with said outlet.

6. A gas heated heating pot including a container of metal, a hollow heating unit of metal provided with a plurality of members extending through the container, said members being welded to the container, said heating unit being spaced from the bottom of the container and also from the top thereof in a manner to present an unobstructed working opening, said heating unit being provided with an inlet at one end and with outlets intermediate the ends with the hollow heating unit disposed for internal reception of a flame and for discharge indirectly through the space adjacent the bottom, and means presenting a surrounding heat insulating structure for said container.

ERNEST C. LUNDT.
NORBERT E. BERTL.